United States Patent [19]

Ogino et al.

[11] Patent Number: 4,761,331

[45] Date of Patent: Aug. 2, 1988

[54] MAGNETIC RECORDING MEDIUM HAVING A BACK COAT LAYER CONTAINING CARBON BLACK TREATED WITH FATTY ACIDS

[75] Inventors: Hiroshi Ogino; Yukio Matsumoto, both of Mito; Hiroshi Togashi, Yamagata; Kumiko Ojima, Mito, all of Japan

[73] Assignee: Victor Company of Japan, Ltd., Yokohama, Japan

[21] Appl. No.: 867,684

[22] Filed: May 28, 1986

[30] Foreign Application Priority Data

May 30, 1985 [JP] Japan .................. 60-115396

[51] Int. Cl.$^4$ .............................. G11B 5/72
[52] U.S. Cl. ...................... 428/323; 427/128; 427/131; 428/403; 428/407; 428/408; 428/694; 428/695; 428/900
[58] Field of Search ............. 427/131, 128; 428/695, 428/694, 403, 407, 408, 900, 323; 360/134–136

[56] References Cited

U.S. PATENT DOCUMENTS

| | | | |
|---|---|---|---|
| 3,956,562 | 5/1976 | Shibata et al. | 428/323 |
| 4,299,736 | 11/1981 | Datta | 252/506 |
| 4,472,336 | 9/1984 | Enoki et al. | 264/106 |
| 4,544,601 | 10/1985 | Yamaguchi | 428/407 |
| 4,578,314 | 3/1986 | Ohta | 428/403 |
| 4,582,757 | 4/1986 | Miyoshi | 428/694 |
| 4,582,759 | 4/1986 | Ota | 428/407 |
| 4,584,243 | 4/1986 | Kadokura | 428/407 |
| 4,592,942 | 6/1986 | Nishimatsu | 428/694 |
| 4,629,646 | 12/1986 | Ide | 428/408 |
| 4,670,333 | 6/1987 | Miyoshi | 428/403 |
| 4,671,993 | 6/1987 | Kadokura | 428/407 |

FOREIGN PATENT DOCUMENTS

| | | |
|---|---|---|
| 1271189 | 6/1968 | Fed. Rep. of Germany . |
| 2250383 | 5/1974 | Fed. Rep. of Germany . |
| 1416946 | 12/1975 | United Kingdom . |

*Primary Examiner*—Ellis P. Robinson
*Attorney, Agent, or Firm*—Lowe, Price, LeBlanc, Becker & Shur

[57] ABSTRACT

A magnetic recording medium comprises a back coat layer on one side of a non-magnetic support which is opposite to a side on which a magnetic recording layer has been formed. The back coat layer is made of a composition which comprises, in a resin binder, carbon black treated with a fatty acid of the formula, RCOOH, in which R represents a linear saturated or unsaturated hydrocarbon having from 13 to 17 carbon atoms. The medium is particularly suitable for high density recording.

2 Claims, No Drawings

MAGNETIC RECORDING MEDIUM HAVING A BACK COAT LAYER CONTAINING CARBON BLACK TREATED WITH FATTY ACIDS

BACKGROUND OF THE INVENTION

1. Field of the Invention

This invention relates to magnetic recording mediums in the form of tapes and disks.

2. Description of the Prior Art

Magnetic recording mediums for use in audio apparatus, video tape recorders and computers show a growing tendency toward higher density. For recording, a high frequency signal is frequently being used. Accordingly, there is a problem that a loss of spacing between a magnetic head and a magnetic recording medium greatly influences the output signal.

In order to reduce the spacing loss, there has been proposed a magnetic recording medium whose magnetic layer is made as smooth or flat as possible.

However, if the surface of the magnetic layer is very flat, the coefficient of friction increases, thus tending to cause the tape winding on a reel to be disarranged. When a tension on the tape varies, a stick-slip phenomenon is liable to take place. Although smooth recording and reproducing operations are ensured, the magnetic tape suffers defects from contact with guide members and flanges of a recording and reproducing apparatus.

In order to overcome the drawbacks, an attempt has been made to make a rough surface on one side of a non-magnetic support which is opposite to a magnetic layer-bearing side. In such a attempt, the rough surface is provided to reduce the coefficient of friction. However, when a magnetic recording medium whose back surface is rough is wound, the irregularities on the rough surface are transferred to the magnetic layer, thereby forming irregularities on the magnetic layer surface. This invites an increasing loss of spacing mentioned above, bringing about a lowering of output.

Another attempt has been made to form a back coat layer on one side of a non-magnetic support in order to reduce the coefficient of friction. In the back coat layer, there are used carbon black and lubricants. However, a mere combination of carbon black and lubricants is disadvantageous in that the surface smoothness is poor, a coefficient of dynamic friction is so large that the travelling performance is not good, and dispersability of carbon black is relatively poor.

SUMMARY OF THE INVENTION

It is an object of the invention to provide a magnetic recording medium which has a back coat layer in which carbon black treated with a fatty acid to have an ester bond therebetween is contained whereby the medium has a small coefficient of dynamic friction and a good travelling performance.

It is another object of the invention to provide a magnetic recording medium which is suitable for high density recording and to ensure a small loss of spacing between a magnetic head and the medium.

According to the invention, there is provided a magnetic recording medium which comprises a non-magnetic support, a magnetic recording layer formed on one side of the support, and a back coat layer formed on the other side. The present invention is characterized by the back coat layer which is made of a composition which comprises a dispersion, in a resin binder, of carbon black treated with a fatty acid to have an ester bond therebetween. By the treatment, carbon black is greatly improved in dispersability, so that the surface property of the back coat layer is improved and the coefficient of dynamic friction of the resultant medium becomes small.

DETAILED DESCRIPTION AND EMBODIMENTS OF THE INVENTION

Carbon black dispersed in resin binders should be treated with fatty acids whereupon the fatty acid is reacted with carbon black through ester bonds. Carbon black used should preferably have a specific surface area not larger than 800 $m^2/g$ as determined by the BET absorption method and an average size of from 0.01 to 0.05 micrometers.

Fatty acids used for the surface treatment are represented by RCOOH, in which R represents a linear saturated or unsaturated hydrocarbon having from 13 to 17 carbon atoms. Examples of the fatty acids include myristic acid, pentadecylic acid, palmitic acid, heptadecylic acid, stearic acid, oleic acid and the like. If the number of carbon atoms is smaller than 13, miscibility with binders lowers. On the other hand, fatty acids having higher carbon atoms are unfavorable because of their high melting point. The fatty acids may be used singly or in combination. For instance, commercially available oleic acid which usually contains 30 to 40 wt % of stearic acid and palmitic acid is appropriately used in the practice of the invention.

The surface treatment of carbon black with fatty acids is carried out as follows. Carbon black and a fatty acid are placed in a solvent in an amount of two times the total amount of the carbon black and the fatty acid, and mixed sufficiently. Preferably, the mixture is heated at 40 to 80° C. for several hours, by which the fatty acid is deposited on the carbon black through ester bonds. The fatty acid is applied to carbon black in an amount of from 1 to 20 wt %, preferably from 5 to 20 wt %, of carbon black. The solvents used for the surface treatment are, for example, aromatic compounds such as toluene, xylene, benzene and the like, ketones such as acetone, methyl ethyl ketone, methyl isobutyl ketone and the like, alcohols such as methanol, ethanol and the like, and mixtures thereof.

The treated carbon black is dispersed in a resin binder in an amount of from 25 to 400 parts by weight per 100 parts by weight of the binder. The binders may be a variety of synthetic resins or semi-synthetic resins. Examples of the synthetic resins include thermoplastic resins such as vinyl chloride-vinyl acetate copolymers, vinyl chloride-vinylidene chloride copolymers, acrylic ester/methacrylic ester-styrene copolymers, acrylic ester/methacrylic ester-vinylidene chloride copolymers, urethane elastomers, and various other synthetic rubbers, and thermosetting resins such as phenolic resins, epoxy resins, alkyl resins, silicone resins, ureaformaldehyde reins, and mixtures thereof. Examples of semisynthetic resins include cellulose derivatives such as nitro cellulose.

The back coat layer may further comprise additives such as lubricants, dispersants, stabilizers and the like.

For the formation of the back coat layer, the treated carbon black and a resin binder are dispersed in a solvent to obtain a paint. The paint is applied onto a non-magnetic support, after or prior to formation of a magnetic recording layer on the support, on a side free of the magnetic recording layer. The applied support is dried and calendered as usual. The solvents used for the purposes may be those as indicated above with regard to the surface treatment. The back coat layer is preferably formed in a thickness of from 0.3 to 1.5 micrometers.

The present invention is not critical with respect to a magnetic recording layer, and any known magnetic recording layers known in the art may be used. This is true of nonmagnetic supports, which may be in the form of films, foils, sheets, disks and the like. The support may be made of a variety of materials including, for example, polyesters, polyolefins, cellulose derivatives, glasses, or ceramics.

The present invention is more particularly described by way of examples.

EXAMPLE 1

A mixture of 100 parts by weight of oleic acid-treated carbon black having a specific surface area of 250 m$^2$/g, an average size of 0.02 micrometers and a content of oleic acid of 5 wt %, 60 parts by weight of nitro cellulose, 50 parts by weight of polyurethane, 2 parts by weight of a fatty acid ester lubricant, and 450 parts by weight of a mixed solvent of toluene and methyl ethyl ketone were mixed in a sand mill. Thereafter, 30 parts by weight of a polyisocyanate curing agent was added to the mixture to obtain a paint. This paint was applied onto a base film on one side which was opposite to a side on which a magnetic layer had been previously formed. The applied film was dried and calendered to form a back coat layer in a thickness of from 0.3 to 1.5 micrometers, thereby obtaining a magnetic tape.

EXAMPLE 2

The general procedure of Example 1 was repeated except that carbon black treated with stearic acid was used, thereby obtaining a magnetic tape.

EXAMPLE 3

The general procedure of Example 1 was repeated except that carbon black treated with palmitic acid was used, thereby obtaining a magnetic tape.

EXAMPLE 4

The general procedure of Example 1 was repeated except that carbon black was treated with 10 wt % of oleic acid, thereby obtaining a magnetic tape.

COMPARATIVE EXAMPLE 1

The general procedure of Example 1 was repeated except that carbon black used was not treated with any fatty acid, thereby obtaining a magnetic tape.

COMPARATIVE EXAMPLES 2-4

The general procedure of Examples 2 to 4 were repeated except that carbon black used was not treated but stearic acid (Comparative Example 2), palmitic acid (Comparative Example 3) and oleic acid (Cmparative Example 4) were, respectively, used in an amount of 5 parts by weight, thereby obtaining magnetic tapes.

The magnetic tapes obtained in examples and comparative examples were subjected to measurement of a coefficient of dynamic friction, an average center line roughness, Ra, and a gloss.

The coefficient of dynamic friction was determined by winding a magnetic tape about a stainless pin having a diameter of 6 mm at an angle of winding in such a way that the back coat layer is turned inside. The magnetic tape was run at a speed of 10 mm/second under a backward tension of 50 g. An inlet tension $T_1$ and an outlet tension $T_2$ with respect to the stainless pin were measured, from which the coefficient was calculated according to the following equation.

$$\mu_k = (1/\pi)\ln(T_2/T_1)$$

The average center line roughness, Ra, was determined at a cut-off value of 0.08 mm.

The gloss was measured by the use of a gloss meter using an angle of incidence of 45°.

The results are shown in the Table below.

TABLE

| | Coefficient of Dynamic Friction | Ra (μm) | Gloss (%) |
|---|---|---|---|
| Example | | | |
| 1 | 0.201 | 0.032 | 99.8 |
| 2 | 0.210 | 0.037 | 89.7 |
| 3 | 0.208 | 0.037 | 95.0 |
| 4 | 0.225 | 0.040 | 88.3 |
| Comparative Example: | | | |
| 1 | 0.289 | 0.081 | 20.5 |
| 2 | 0.258 | 0.054 | 30.2 |
| 3 | 0.261 | 0.068 | 25.4 |
| 4 | 0.254 | 0.065 | 31.0 |

From the above results, it will be apparent that the addition of the treated carbon black to the back coat layer is effective in decreasing the coefficient of dynamic friction and thus improves the travelling performance. Since the surface smoothness is high, little irregularities are formed on the magnetic layer when the tape is wound about a reel. Thus, the spacing loss becomes small with a good reproduction output. As will be seen from the results of the gloss, the treated carbon black is well dispersed in the binder.

On the other hand, the results of the comparative examples reveal that when carbon black not treated with fatty acids is incorporated in the back coat layer, the coefficient of dynamic friction is high and the surface smoothness is not good, so that irregularities are formed on the magnetic layer surface when the tapes are wound. This leads to an increasing loss of spacing with a lowering of reproduction output. In addition, non-treated carbon black is not uniformly dispersed.

What is claimed is:

1. In a magnetic recording medium which comprises a nonmagnetic support, a magnetic recording layer formed on one side of the support, and a back coat layer formed on the other side of the support, said back coat layer being made of a composition comprising from 25 to 400 parts by weight of carbon black dispersed in 100 parts by weight of a resin binder, the improvement characterized in that said carbon black has a specific surface area not larger than 800 m$^2$/g as determined by the BET absorption method and an average size of from 0.01 to 0.05 micrometers, and said carbon black is treated, prior to dispersion in the resin binder, with a fatty acid of the formula, RCOOH, in which R represents a linear saturated or unsaturated hydrocarbon residue having from 13 to 17 carbon atoms, in such a way that said fatty acid is deposited on the carbon black in an amount of from 1 to 20 wt %.

2. A magnetic recording medium according to claim 1, wherein the fatty acid is deposited in an amount of from 5 to 20 wt %.

* * * * *